United States Patent
Diaz-Auñon et al.

(10) Patent No.: US 12,304,817 B2
(45) Date of Patent: May 20, 2025

(54) CARBON FOAMS AND METHODS OF MAKING AND USING SAME

(71) Applicant: Immutrix Therapeutics, Inc., Rapid City, SD (US)

(72) Inventors: Jose A. Diaz-Auñon, Rapid City, SD (US); Oleksandr Kozynchenko, Rapid City, SD (US)

(73) Assignee: Immutrix Therapeutics, Inc., Rapid City, SD (US)

( * ) Notice: Subject to any disclaimer, the term of this patent is extended or adjusted under 35 U.S.C. 154(b) by 1225 days.

(21) Appl. No.: 16/753,251

(22) PCT Filed: Oct. 4, 2018

(86) PCT No.: PCT/US2018/054454
§ 371 (c)(1),
(2) Date: Apr. 2, 2020

(87) PCT Pub. No.: WO2019/071035
PCT Pub. Date: Apr. 11, 2019

(65) Prior Publication Data
US 2020/0331756 A1     Oct. 22, 2020

Related U.S. Application Data

(60) Provisional application No. 62/568,387, filed on Oct. 5, 2017.

(51) Int. Cl.
*C01B 32/05* (2017.01)
*C08G 14/06* (2006.01)
(Continued)

(52) U.S. Cl.
CPC .............. *C01B 32/05* (2017.08); *C08G 14/06* (2013.01); *C08J 9/0066* (2013.01); *C08J 9/0085* (2013.01);
(Continued)

(58) Field of Classification Search
CPC ....... C01B 32/05; C08J 9/0066; C08J 9/0085; C08J 9/283; C08J 2361/34;
(Continued)

(56) References Cited

U.S. PATENT DOCUMENTS 3,302,999 A * 2/1967 Mitchell ............. C04B 38/0022
264/29.7
6,899,970 B1 * 5/2005 Rogers .................... C01B 32/05
264/43

(Continued)

FOREIGN PATENT DOCUMENTS

CN        106115689 A    11/2016
WO        0212380 A2     2/2002
(Continued)

OTHER PUBLICATIONS

Machine Translation of CN 106115689 by Mei et al. (Year: 2016).*
(Continued)

*Primary Examiner* — Christina H. W. Rosebach
(74) *Attorney, Agent, or Firm* — Barnes & Thornburg LLP; Jerry C. Harris, Jr.

(57) ABSTRACT

A method of forming a carbon foam material comprises forming an emulsion may include a phenol formaldehyde and hexamine in monoethylene glycol and water, curing the emulsion to yield a cured resin, and carbonizing the cured resin to form the carbon foam material. Forming the emulsion may include dispersing the phenol formaldehyde and hexamine in the monoethylene glycol to form an initial solution, contacting the initial solution with the water to form an initial emulsion, and agitating the initial emulsion to form an agitated emulsion. The method may further comprise contacting the agitated emulsion with an oil. Also, a carbon foam material that may be characterized as exhibiting a density of less than about 0.500 g/cc, as exhibiting a (Continued)

compressive strength equal to or greater than about 200 psi, or both.

7 Claims, 2 Drawing Sheets

(51) Int. Cl.
    *C08J 9/00*     (2006.01)
    *C08J 9/28*     (2006.01)
    *C08G 101/00*     (2006.01)

(52) U.S. Cl.
    CPC ........... *C08J 9/283* (2013.01); *C01P 2006/10* (2013.01); *C08G 2101/00* (2013.01); *C08J 2201/0546* (2013.01); *C08J 2361/34* (2013.01)

(58) Field of Classification Search
    CPC ............. C08J 2201/0546; C08G 14/06; C08G 2101/00; C01P 2006/10
    See application file for complete search history.

(56) References Cited

U.S. PATENT DOCUMENTS

| | | |
|---|---|---|
| 2007/0154381 A1 | 7/2007 | Miller et al. |
| 2010/0297389 A1 | 11/2010 | Dai et al. |
| 2010/0308280 A1 | 12/2010 | Miller et al. |
| 2011/0097583 A1 | 4/2011 | Tenninson et al. |

FOREIGN PATENT DOCUMENTS

| | | |
|---|---|---|
| WO | 2013051745 A1 | 4/2013 |
| WO | 2019071035 A1 | 4/2019 |

OTHER PUBLICATIONS

Sihn, S. et al. Modeling and prediction of bulk properties of open-cell carbon foam. Journal of the Mechanics and Physics of Solids 52 (2004) pp. 167-191. (Year: 2004).*

European Patent Office, Extended European Patent Search issued in corresponding EP Patent Application 18864919.8, Jun. 23, 2021, 9 pages.

Filing receipt and specification for provisional patent application entitled "Novel Carbon Foams and Methods of Making and Using Same," by Diaz-Aunon, et al., filed Oct. 4, 2018 as U.S. Appl. No. 62/568,387.

* cited by examiner

CARBON FOAMS AND METHODS OF MAKING AND USING SAME

CROSS-REFERENCE TO RELATED APPLICATIONS

This application is a filing under 35 U.S.C. 371 of International Application No. PCT/US2018/054454 filed on Oct. 4, 2018, which is a continuation of and claims priority to U.S. Provisional Application Ser. No. 62/568,387 entitled "Novel Carbon Foams and Methods of Making and Using Same" and filed on Oct. 5, 2017, which is incorporated herein in its entirety.

TECHNICAL FIELD

The present disclosure relates to novel carbonaceous materials and methods of making and using same. More particularly, the present disclosure relates to novel foamed carbonaceous materials, the preparation of the novel foamed carbonaceous materials and applications of such materials.

BACKGROUND

The low thermal coefficient for expansion of carbon foam material (CFM) makes it an economical alternative to conventional superalloys used in tooling for molding aerospace carbon-fiber-reinforced thermoset and thermoplastic composites. In addition, CFMs characteristically display properties such as large geometric surface area, electrical conductivity, and light weight. Moreover, CFMs which can provide well-defined pathways for reactants to easily access active sites, may be extremely useful for energy conversion as well as environmental and catalysis applications. To date, many precursors have been used for fabrication of 3D-structured carbon materials including pitch, carbon nanotubes, graphene, and polymer foams. Further various methodologies to produce CFMs have been described. CFMs while having a broad range of applications present a continuing process economics challenge.

Thus, an ongoing need exists for CFMs having one or more user and/or process desired properties and methods of making same.

SUMMARY

In some aspects, a method of forming a carbon foam material comprises forming an emulsion comprising a phenol formaldehyde and hexamine in monoethylene glycol and water, curing the emulsion to yield a cured resin, and carbonizing the cured resin to form the carbon foam material. Forming the emulsion comprises dispersing the phenol formaldehyde and hexamine in the monoethylene glycol to form an initial solution, contacting the initial solution with the water to form an initial emulsion, and agitating the initial emulsion to form an agitated emulsion. In some aspects, the method further comprises contacting the agitated emulsion with an oil. The oil may be a synthetic oil, a vegetable oil, or a combination thereof. The oil may be contacted with the agitated solution at a ratio from about 0.01 to about 5.0, by weight of the agitated solution. The monoethylene glycol to phenol formaldehyde and hexamine ratio may be from about 0.75:1 to about 2.50:1, by weight. The water may be present in an amount from about 10% to about 20% by weight of the monoethylene glycol. The phenol formaldehyde may comprise a novolac, for example, a high-ortho novolac. In some aspects, the method may further comprise incorporating an additive within the emulsion, and the additive may comprise a ceramic, a metal, a fiber or a combination thereof. For example, the additive may comprise hydroxyapatite, iron, copper, carbon fiber, or combinations thereof. Curing the emulsion may comprise heating the emulsion to a temperature from about 50° C. to about 200° C. in the substantial absence of oxygen. Carbonizing the cured resin may comprise heating the cured resin to a temperature from about 700° C. to about 1500° C. in a substantially inert atmosphere.

Also disclosed herein is a carbon foam material that may be characterized as exhibiting a density of less than about 0.500 g/cc, as exhibiting a compressive strength equal to or greater than about 200 psi or both as exhibiting a density of less than about 0.500 g/cc and a compressive modulus equal to or greater than about 30 ksi. Additionally or alternatively, the carbon foam material may be characterized as exhibiting a density of less than about 0.350 g/cc, as exhibiting a compressive strength equal to or greater than about 200 psi, or both as exhibiting a density of less than about 0.350 g/cc and a compressive modulus equal to or greater than about 30 ksi. In some aspects, the carbon foam material may be produced by a process comprising forming an emulsion comprising a phenol formaldehyde and hexamine in monoethylene glycol and water, curing the emulsion to yield a cured resin, and carbonizing the cured resin to form the carbon foam material.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION

Figure 1:
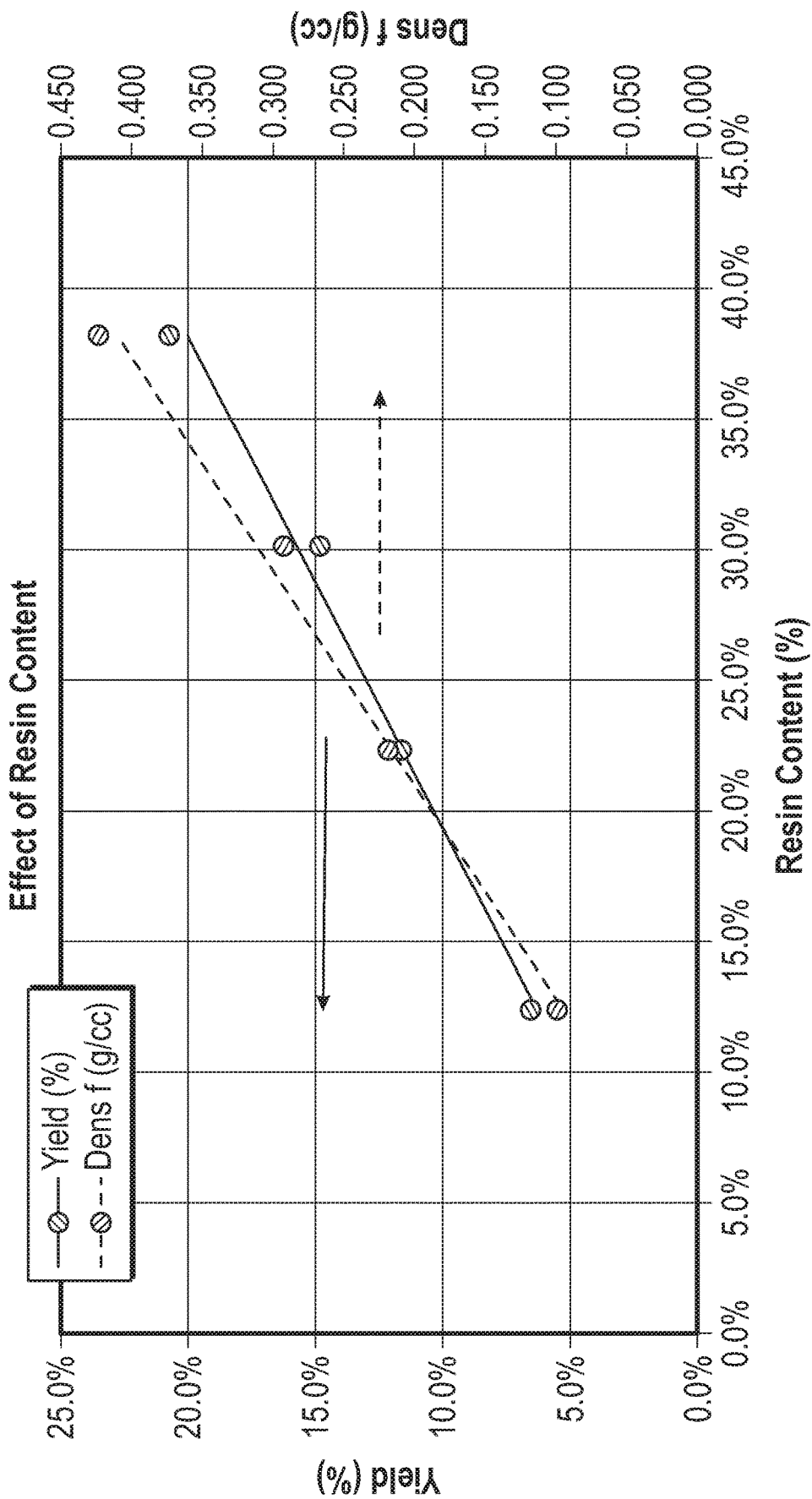
FIG. 1 is a graphical illustration of the relationship between concentration of the resin utilized in a method to form a CFM of the type disclosed herein and final, resultant density of the CFM.

Disclosed herein are novel CFMs, composite materials comprising CFMs, and methods of making and using same.

In various aspects, the CFM comprises primarily carbon, for example, at least about 80 weight percent (wt. %) carbon, or at least about 82 wt. % carbon, or at least about 84 wt. % carbon, or at least about 86 wt. % carbon, or at least about 88 wt. % carbon, or at least about 90 wt. % carbon, or at least about 92 wt. % carbon, or at least about 94 wt. % carbon, or at least about 96 wt. % carbon, or at least about 98 wt. % carbon, or at least about 99 wt. % carbon.

In some aspects, the CFM may be characterized as exhibiting a density in the range of from about 0.05 g/cc to about 2.0 g/cc, or about 0.05 g/cc to about 0.5 g/cc, or from about 0.08 g/cc to about 0.4 g/cc, or from about 0.1 g/cc to about 0.3 g/cc, as determined using any suitable methodology such as ASTM D1622. For example, the CFM may be characterized as exhibiting a density of not more than about 2.0 g/cc, or not more than about 0.5 g/cc, or not more than about 0.45 g/cc, or not more than about 0.40 g/cc, or not more than about 0.39 g/cc, or not more than about 0.38 g/cc, or not more than about 0.37 g/cc, or not more than about 0.36 g/cc, or not more than about 0.35 g/cc, or not more than about 0.34 g/cc, or not more than about 0.33 g/cc, or not more than about 0.32 g/cc, or not more than about 0.31 g/cc, or not more than about 0.30 g/cc, as determined using any suitable methodology such as ASTM D1622.

In some aspects, the CFM may be characterized as a porous material, for example, having a plurality of at least partially-interconnected pores. In some aspects, the pores of the CFM may have an average pore size that varies according to needs of an intended usage of the CFM. For example, the CFM may have an average pore size in a range of from about 3,000 microns to about 7,000 microns, or of from about 4,000 microns to about 6,000 microns, or of from about 4,500 microns to about 5,500 microns.

In some aspects, the CFM disclosed herein may comprise a component of a CFM composite. For example, in some aspects a CFM composite may comprise the CFM as disclosed herein and at least one additive. For example, in various aspects the additive may comprise a reinforcing agent, a catalytic metal, a conductivity-enhancing agent, a magnetic agent, or combinations thereof. Examples of additives may include, but are not limited to, a ceramic, a metal, a fiber or a combination thereof. More specific examples of additives may include, but are not limited to, hydroxyapatite, iron, copper, carbon fiber, or combinations thereof.

In some aspects, the additive may be incorporated within the CFM, for example, such that the CFM forms a matrix (e.g., a binder) having the additive distributed within or intimately dispersed throughout the CFM. Additionally or alternatively, in some aspects, the CFM may be coated with one or more additives, such as a metal (e.g., an iron compound or copper compound) such the additive forms a discernible layer on at least 50% of an exterior surface of the CFM. The layer may have a thickness ranging from about 0.001 mils to about 1 mil.

In some aspects, the CFM composite may be characterized as having a combination of desirable properties such that the CFM may be advantageously employed in a desired application. For example, the additive may be effective to impart certain properties to the CFM composite. In various aspects, the CFM composite may be characterized as exhibiting a desired degree of magnetism, electrical conductivity, thermal conductivity, biocompatibility, peak stress, comprehensive modulus, Young's modulus, compressive strength, plateau stress, densification strain, or combinations thereof. These properties may be determined in accordance with any suitable methodology such as deriving values from a graph of compressive stress-strain curves. For example, in various aspects the CFM composite may be advantageously employed to form a material that is relatively lightweight (e.g., having a density of not more than about 0.50 g/cc, or not more than about 0.45 g/cc, or not more than about 0.40 g/cc, or not more than 0.35 g/cc). In various aspects, such CFMs, CFM composites or both may be characterized as exhibiting a compressive strength of equal to or greater than about 200 psi, or equal to or greater than about 500 psi, or equal to or greater than about 700 psi, or from about 200 psi to about 2000 psi, or from about 200 psi to about 1000 psi. Additionally or alternatively, in various aspects such CFMs, CFM composites or both may be characterized as exhibiting a compressive modulus equal to or greater than about 30 ksi, or greater than about 50 ksi, or equal to or greater than about 80 ksi, or from about 30 ksi to about 100 ksi. Additionally or alternatively, in various aspects such CFMs, CFM composites or both may be characterized as exhibiting a tensile strength equal to or greater than about 250 psi, or equal to or greater than about 300 psi, or equal to or greater than about 350 psi, or equal to or greater than about 400 psi, or from about 250 psi to about 750 psi. Additionally or alternatively, in various aspects such CFMs, CFM composites or both may be characterized as exhibiting a tensile modulus of equal to or greater than about 30 ksi, or equal to or greater than about 40 ksi, or equal to or greater than about 50 ksi, or equal to or greater than about 60 ksi, or equal to or greater than about 70 ksi or from about 30 ksi to about 80 ksi. Additionally or alternatively, in various aspects such CFMs, CFM composites or both may be characterized as exhibiting a shear strength equal to or greater than about 200 psi, or equal to or greater than about 250 psi, or equal to or greater than about 300 psi, or from about 200 psi to about 500 psi. The compressive strength, compressive modulus, tensile strength, tensile modulus and shear strength may be determined in accordance with any suitable methodology such as ASTM/ISO standardized tests, experimental determinations utilizing the appropriate instrumentation and the like.

In some aspects, the CFMs disclosed herein may be prepared by a method generally comprising forming an emulsion comprising a phenol formaldehyde and hexamine in monoethylene glycol and water, curing the emulsion to yield a cured resin, and carbonizing the cured resin to form the CFM.

In some aspects, the phenol formaldehyde and hexamine in monoethylene glycol and water emulsion may be formed by dispersing the phenol formaldehyde and the hexamine in the monoethylene glycol to form an initial solution. Generally, phenol formaldehyde resins refer to synthetic polymers resultant from the reaction of a phenol or substituted phenol with a formaldehyde. Not intending to be bound by theory, the hexamine (also referred to as hexamethylenetetramine, $(CH_2)_6N_4$) may function as a formaldehyde source. In alternative aspects, other suitable formaldehyde sources will be appreciated by those of skill in the art upon viewing this disclosure. The reaction between the phenol or substituted phenol and the formaldehyde may yield polymers comprising phenol groups joined via para/para, para/ortho, ortho/ortho methylene linkages or combinations thereof.

In some aspects, the phenol formaldehyde resin comprises a novolac. Generally, novolacs are phenol formaldehyde resins wherein the formaldehyde to phenol molar ratio is less than one. In some aspects the phenol formaldehyde resin comprises a high-ortho novolac. Generally, high-ortho novolacs may be characterized as having a relatively high proportion of ortho/ortho methylene linkages. For example, in various aspect, a high-ortho novolac may be characterized as comprising at least 40% ortho/ortho methylene linkages, or at least 45% ortho/ortho methylene linkages, or at least 50% ortho/ortho methylene linkages, or at least 55% ortho/ortho methylene linkages, or at least 60% ortho/ortho methylene linkages, or at least 65% ortho/ortho methylene linkages, or at least 70% ortho/ortho methylene linkages.

In some aspects, the phenol formaldehyde and hexamine may be pre-mixed prior to being dispersed in the monoethylene glycol. The ratio of the monoethylene glycol to the premixed phenol formaldehyde and hexamine, together, dispersed in the monoethylene glycol may be from about from about 0.05:1 to about 1,000:1, or from about 0.25:1 to about 100:1, or from about 0.5:1 to about 5:1, or from about 0.75:1 to about 2.50:1, by weight.

In some aspects, the phenol formaldehyde and hexamine in monoethylene glycol and water emulsion may also be formed by contacting the initial solution with water to form an initial emulsion. For example, water may be present in an amount from about 10% to about 20% by weight of the monoethylene glycol.

In some aspects, the phenol formaldehyde and hexamine in monoethylene glycol and water emulsion may also be formed by agitating the initial emulsion to form an agitated emulsion. For example, the initial emulsion may be subjected to high-shear agitation, for example, using a high-shear mixer at from about 1,500 rpm to about 2,000 rpm.

In some aspects, the agitated emulsion may be contacted with an oil to form the emulsion. In various aspects, the oil is a synthetic oil, a vegetable oil or a combination thereof. The oil may be contacted with the agitated solution at a ratio from about 0.01 to about 5.0, or from about 0.50 to about 2.5, or from about 1.0 to about 2.0, or from about 1.10 to about 1.50, by weight of the agitated solution. Contacting the agitated emulsion with the oil may be effective to homogenize, stabilize, and/or thicken the agitated emulsion. In some aspects, the emulsion formed via the methods disclosed herein may be characterized as sufficiently stable so as to be cured to form a cured resin.

In some aspects, an additive, as disclosed herein, may be incorporated within the emulsion. For example, by incorporating the additive within the emulsion, a CFM composite as disclosed herein may be obtained.

In some aspects, the emulsion may be cured by thermally treating the emulsion, for example, in an atmosphere from which oxygen is substantially absent. For example, the emulsion may be treated at a temperature of from about 50° C. to about 200° C., or from about 90° C. to about 160° C., or from about 120° C. to about 150° C. In various aspects, the emulsion may be treated for a time period of from about 10 min to about 48 h, or from about 10 min to about 24 h, or from about 10 min to about 90 min. In some aspects, the atmosphere from which oxygen is substantially absent may include less than about 5.0% oxygen by weight, or less than about 2.5% oxygen, or less about 1.0% oxygen, or less than about 0.8% oxygen, or less than about 0.7% oxygen, or less than about 0.6% oxygen, or less than about 0.5% oxygen, or less than about 0.4% oxygen, or less than about 0.3% oxygen, or less than about 0.2% oxygen, or less than about 0.1% oxygen or less than about 0.05% oxygen, or less than about 0.01% oxygen, or less than about 0.005% oxygen, or less than about 0.001% oxygen. Alternatively, in some aspects the emulsion may be cured by thermally treating the emulsion in the presence of oxygen characterized by an amount of oxygen greater than about 5% by weight.

In some aspects, the cured resin may be carbonized to form the carbon foam material (i.e., the CFM). For example, carbonization of the cured resin may comprise pyrolysis of the cured resin in a substantially inert atmosphere. In some aspects, carbonization of the cured resin may be carried out by heating the cured resin to a temperature of from about 400° C. to about 2000° C., or from about 500° C. to about 1500° C., or from about 600° C. to about 1000° C. In some aspects, the cured resin may be heated for a time period of from about 1 min to about 24 h, or from about 15 min to about 2 h, or from about 30 min to about 1 h. The substantially inert atmosphere may comprise at least 95% by weight of a gas such as carbon dioxide, nitrogen, argon, helium, or combinations thereof, or at least 99%, at least 99.5%, at least 99.9%, at least 99.99%, at least 99.999%, at least 99.9999%, at least 99.99999%. In some aspects, a blowing agent such as carbon dioxide is excluded.

In some aspects, a CFM of the type disclosed herein is carbonized, alternatively the resultant composite is not carbonized.

In some aspects, the properties of CFMs disclosed herein may be altered to meet one or more user and/or process goals. For example, by modifying the ratio between the resin phase and the oil phase, the porosity and density of the resulting CFM may be altered to meet one of more user-desired parameters such as thermal conductivity, compressive strength and Young's modulus.

In various aspects, the CFM and/or the CFM composite disclosed herein may be used to form components for a variety of instruments and for use in a variety of applications such as space telescopes; high power lasers; composite tooling; vehicle blast mitigation; radar absorption; aircraft and ship applications such as interior panels and nonstructural bulkheads, structural insulation or sound absorption panels; electromagnetic shielding/absorption panels for ship topside structures; fire-resistant articles and ablation panels.

The following embodiments demonstrate additional aspects of to disclosed subject matter.

A first embodiment is a method of forming a carbon foam material, the method comprising forming an emulsion comprising a phenol formaldehyde and hexamine in monoethylene glycol and water, curing the emulsion to yield a cured resin, and carbonizing the cured resin to form the carbon foam material.

A second embodiment is the method of the first embodiment, wherein forming the emulsion comprises dispersing the phenol formaldehyde and hexamine in the monoethylene glycol to form an initial solution, contacting the initial solution with the water to form an initial emulsion, and agitating the initial emulsion to form an agitated emulsion.

A third embodiment is the method of the second embodiment, further comprising contacting the agitated emulsion with an oil.

A fourth embodiment is the method of the third embodiment, wherein the oil is a synthetic oil, a vegetable oil or a combination thereof.

A fifth embodiment is the method of one of the third through the fourth embodiments, wherein the oil is contacted with the agitated solution at a ratio from about 0.01 to about 5.0, by weight of the agitated solution.

A sixth embodiment is the method of one of the first through the fifth embodiments, wherein the monoethylene glycol to phenol formaldehyde and hexamine ratio from about 0.75:1 to about 2.50:1, by weight.

A seventh embodiment is the method of one of the first through the sixth embodiments, wherein the water is present in an amount from about 10% to about 20% by weight of the monoethylene glycol.

An eighth embodiment is the method of one of the first through the seventh embodiments, wherein the phenol formaldehyde comprises a novolac.

A ninth embodiment is the method of one of the first through the eighth embodiments, wherein the phenol formaldehyde comprises a high-ortho novolac.

A tenth embodiment is the method of one of the first through the ninth embodiments, further comprising incorporating an additive within the emulsion wherein the additive comprises a ceramic, a metal, a fiber or a combination thereof.

An eleventh embodiment is the method of the tenth embodiments, wherein the additive comprises hydroxyapatite, iron, copper, carbon fiber, or combinations thereof.

A twelfth embodiment is the method of one of the tenth through the eleventh embodiments, wherein curing the emulsion comprises heating the emulsion to a temperature from about 50° C. to about 200° C. in the substantial absence of oxygen.

A thirteenth embodiment is the method of one of the tenth through the twelfth embodiments, wherein carbonizing the cured resin comprises heating the cured resin to a temperature from about 700° C. to about 1500° C. in a substantially inert atmosphere.

A fourteenth embodiment is the method of one of the first through the thirteenth embodiments, wherein the carbon foam material is characterized as exhibiting a density of less than about 0.500 g/cc.

A fifteenth embodiment is the method of one of the first through the fourteenth embodiments, wherein the carbon foam material is characterized as exhibiting a compressive strength equal to or greater than about 200 psi.

A sixteenth embodiment is a carbon foam material characterized as exhibiting a density of less than about 0.500 g/cc and a compressive strength equal to or greater than about 200 psi and a compressive modulus equal to or greater than about 30 ksi.

A seventeenth embodiment is the carbon foam material of the sixteenth embodiment, wherein the carbon foam material is characterized as exhibiting a density of less than about 0.350 g/cc.

An eighteenth embodiment is the carbon foam material of one of the sixteenth through the seventeenth embodiments, wherein the carbon foam material is characterized as exhibiting a compressive strength equal to or greater than about 200 psi and a compressive modulus equal to or greater than about 30 ksi.

A nineteenth embodiment is the carbon foam material of one of the sixteenth through the eighteenth embodiments, wherein the carbon foam material is produced by a process comprising forming an emulsion comprising a phenol formaldehyde and hexamine in monoethylene glycol and water, curing the emulsion to yield a cured resin, and carbonizing the cured resin to form the carbon foam material.

A twentieth embodiment is the carbon foam material of the nineteenth embodiment, wherein the process further comprises dispersing the phenol formaldehyde and hexamine in the monoethylene glycol to form an initial solution, contacting the initial emulsion with the water to form an initial emulsion, and agitating the initial solution to form an agitated emulsion.

A twenty-first embodiment is the carbon foam material of the twentieth embodiment, wherein the process further comprises contacting the agitated solution with an oil.

A twenty-second embodiment is the carbon foam material of the twenty-first embodiment, wherein the oil is tung oil.

A twenty-third embodiment is the carbon foam material of one of the twenty-first through the twenty-second embodiments, wherein the oil is contacted with the agitated solution at a ratio from about 0.01 to about 2.0, by weight of the agitated solution.

EXAMPLES

The following Examples demonstrate additional aspects of the CFMs, CFM composites, and methods of making and using the same having been previously disclosed. Although the following Examples may set forth particular aspects of the CFMs, CFM composites, and methods of making and using the same, these Examples should not be construed as limiting the disclosed CFMs, CFM composites, and methods of making and using the same to any particular aspect.

Example 1

A plurality of samples, particularly, Samples 1 through 9, below, comprising carbon foam materials (i.e., a CFM) and/or composite materials comprising carbon foam materials (i.e., CFM composites) were prepared according to the following method. A premixed solution of novolac and hexamine in monoethylene glycol was added to water (between 10%-20% of the monoethylene glycol, by weight) to render to a solution opaque and yellow in color. The application of high-shear agitation of up to 2,000 rpm to the solution yielded an emulsion.

When this emulsion was contacted with oil in the presence of Tung oil as a surfactant (1% of oil phase), the emulsion became more homogenous and thickened. The amount of oil, in various samples, ranges from about 0 to about 2 times the total amount of resin (i.e., novolac and hexamine, by weight) in the solution. The emulsion was stable and was placed in a tray and cured in the temperature range of from about 120° C. to about 140° C. The resulting cured material was a yellow block. In various samples, the cured material was carbonized at temperatures of at least 700° C. to yield a CFM having the properties shown below in Table 1. Also, in various Samples, additives were incorporated within the CFM to yield various CFM composites. Particularly, in Samples 5 and 8 the emulsion was doped with an Fe solution; in Sample 6 the emulsion was doped with carbon fiber; and in Sample 9, the emulsion was doped with a hydroxyapatite solution to result in a 10% doping by weight of resin for Samples 5 and 8 while the hydroxyapatite was 30% doping by weight of resin.

TABLE 1

| Sample | Ratio of MEG/(novolac + hexamine (wt.) | Ratio of oil/resin (wt.) | Additives | Carbonization Temp. |
|---|---|---|---|---|
| Sample 1 | 1.39 | 2 | — | 700° C. |
| Sample 2 | 1.39 | 1 | — | 700° C. |
| Sample 3 | 1.39 | 0.5 | — | 700° C. |
| Sample 4 | 1.39 | 0 | — | 700° C. |
| Sample 5 | 1.39 | 1 | Fe | 700° C. |
| Sample 6 | 1.39 | 1 | CF | 700° C. |
| Sample 7 | 1.39 | 1 | — | 1,200° C. |
| Sample 8 | 1.39 | 1 | Fe | 1,200° C. |
| Sample 9 | 1.39 | 1 | HA | 700° C. |

The CFMs obtained demonstrated a range of advantageous properties, as shown in Table 2, below.

TABLE 2

| Sample | % Resin | Wi (g) | Wf (g) | Yield (%) | Density-Initial (g/cc) | V comp (%) | Density-Final (g/cc) |
|---|---|---|---|---|---|---|---|
| Sample 1 | 12.3% | 64.39 | 4.27 | 6.6% | 0.82 | 46.8% | 0.102 |
| Sample 2 | 22.2% | 113.5 | 13.32 | 11.7% | 0.90 | 52.0% | 0.221 |
| Sample 3 | 30.1% | 81.89 | 12.22 | 14.9% | 0.97 | 51.0% | 0.295 |
| Sample 4 | 38.1% | 96.09 | 19.99 | 20.8% | 0.86 | 57.9% | 0.426 |
| Sample 5 | 20.0% | 87.8 | 9.36 | 10.7% | 0.87 | 55.1% | 0.207 |
| Sample 6 | 20.0% | 92.91 | 11.71 | 12.6% | 0.89 | 49.6% | 0.223 |
| Sample 7 | 22.2% | 154.02 | 15.35 | 10.0% | 0.92 | 56.9% | 0.214 |
| Sample 8 | 20.0% | 144.6 | 14.27 | 9.9% | 0.89 | 57.3% | 0.205 |
| Sample 9 | 23.4% | 164.0 | 28.94 | 17.6 | 1.11 | 56.9 | 0.340 | where Wi and Density initial refers to the weight and density respectively before carbonization while Wf and Density final refers to the weight and density respectively after carbonization.

The results indicate that a CFM that is very light is obtained where a relatively high oil content (e.g., about 0.1 g/cc of density for oil/resin ratio of 2) is used. The results also indicate that a CFM that is very strong is obtained where a relatively low oil content (e.g., oil/resin 0.5/1) is used. Further, these results demonstrate that the concentration of the resin yields a generally-linear effect on final density, as shown in FIG. 1. Further still, these results also demonstrated the versatility of the disclosed CFMs and CFM composites. Particularly, the CFM can incorporate carbon fiber for reinforcement (e.g., for engineering applications) or hydroxyapatite as a possible application in synthetic bones. Similarly, the CFM can incorporate various metal salts to obtain different applications. For instance, Table 3 demonstrates the effect of various additives on electrical properties of the resultant CFM. These results were measured experimentally.

TABLE 3

| Sample | % Resin | Resistivity (Ω cm) |
|---|---|---|
| Sample 0 | 41.7 | 13.6 |
| Sample 1 | 12.3% | 59100 |
| Sample 2 | 22.2% | 1407 |
| Sample 3 | 30.1% | 791 |
| Sample 4 | 20.0% | 18.9 |
| Sample 6 | 20.0% | 7.4 |
| Sample 7 | 22.2% | 0.2 |
| Sample 8 | 20.0% | 0.3 |

As demonstrated, the original formulation, designated Sample 0, with a MEG/resin ratio of 1.39 in the absence of water and not emulsified, had a strong impact on the electrical conductivity of the material. Moreover, the presence of a dopant (i.e., any suitable conductive material) yields significant improvements to the electrical properties. Also, carbonization up to 1,200° C. instead of 700° C. produced a similar or increased effect on electrical properties of the material when compared to the samples having a metal dopant.

Example 2

Figure 2:
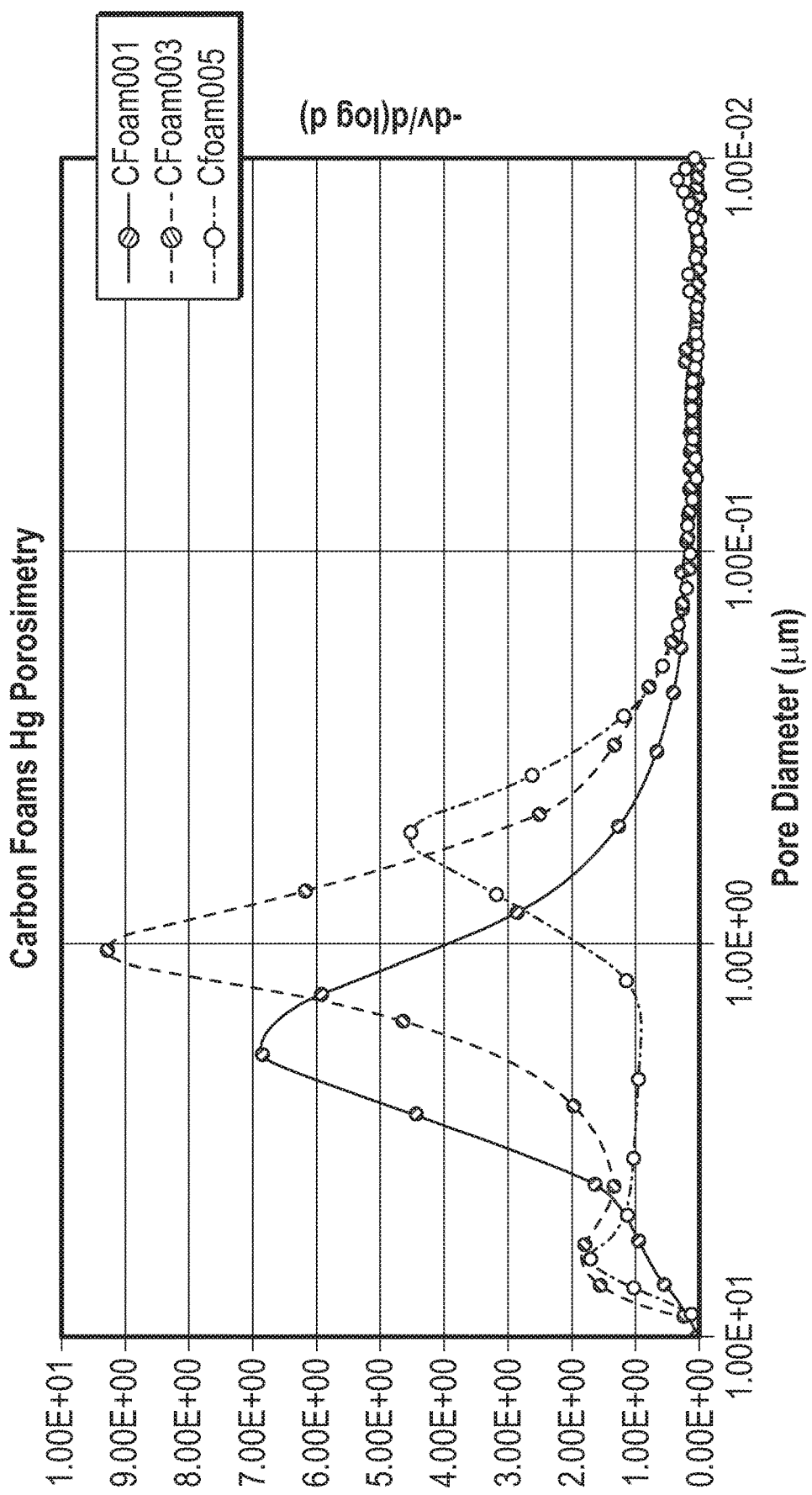
FIG. 2 is a graphical illustration of mercury porosimetry analysis of CFM samples of the type disclosed herein.

A carbon foam material (i.e., CFM) was prepared by contacting 705 g of NOVALAK solution (57% monoethylene glycol, 35.83% NOVALAK PLENCO 15172 and 7.17% Hexamine), with 275 g of monoethylene glycol and 76 g of distilled water to form a mixture that was subsequently stirred at room temperature until an opaque homogeneous yellow emulsion is formed. The mixture was then contacted with 1442 g of a synthetic oil to form a thick emulsion. The resulting emulsion was cured to a solid by heating to a temperature of 140° C. for 60 minutes. The cured solid was then carbonized in the presence of carbon dioxide to 800° C. and kept at such temperature for 60 min. Mercury porosimetry analysis of CFM samples of the type disclosed herein are presented in FIG. 2.

An additional set of samples, designated M1, M2 and M3 were analyzed for their comprehensive strength. The results are presented in Table 4.

TABLE 4

| Sample | Oil/resin ratio | Pore Volume (g/cc) | Pore size (nm) | Apparent Density (g · cc) | Peak Stress (MPa) | Compressive Modulus (GPa) |
|---|---|---|---|---|---|---|
| M1 | 2.0 | 5.45 | 1080 | 0.09 | NT* | NT |
| M2 | 1.0 | 3.17 | 534 | 0.27 | 5.35 | 0.56 |
| M3 | 1.0 | 2.73 | 558 | 0.22 | 2.59 | 0.23 |

*NT means not tested.

What is claimed is:

1. A carbon foam material characterized as exhibiting a density of less than about 0.500 g/cc, an average pore size from about 3,000 μm to about 7,000 μm a compressive strength from about 200 psi to about 2000 psi, a compressive modulus equal to or greater than about 30 ksi, and a tensile modulus of equal to or greater than about 30 ksi.

2. The carbon foam material of claim 1, wherein the carbon foam material is characterized as exhibiting a density of less than about 0.350 g/cc.

3. The carbon foam material of claim 1, wherein the carbon foam material is characterized as exhibiting a compressive modulus equal to or greater than about 50 ksi.

4. The carbon foam material of claim 1, wherein the carbon foam material is produced by a process comprising:

forming an emulsion comprising a phenol formaldehyde and hexamine in monoethylene glycol and water;

curing the emulsion to yield a cured resin; and carbonizing the cured resin to form the carbon foam material.

5. The carbon foam material of claim 4, wherein the process further comprises:

dispersing the phenol formaldehyde and hexamine in the monoethylene glycol to form an initial solution;

contacting the initial solution with the water to form an initial emulsion; and agitating the initial emulsion to form an agitated emulsion.

6. The carbon foam material of claim 1, wherein the carbon foam material is characterized as having an average pore size from about 6,000 μm to about 4,000 μm.

7. The carbon foam material of claim 1, wherein the carbon foam material is characterized as having an average pore size from about 4,500 μm to about 5,000 μm.

* * * * *